Mar. 6, 1923.
J. N. ALSOP
1,447,401
APPARATUS FOR PRODUCING SMOKE
Filed Aug. 11, 1921 3 sheets-sheet 2
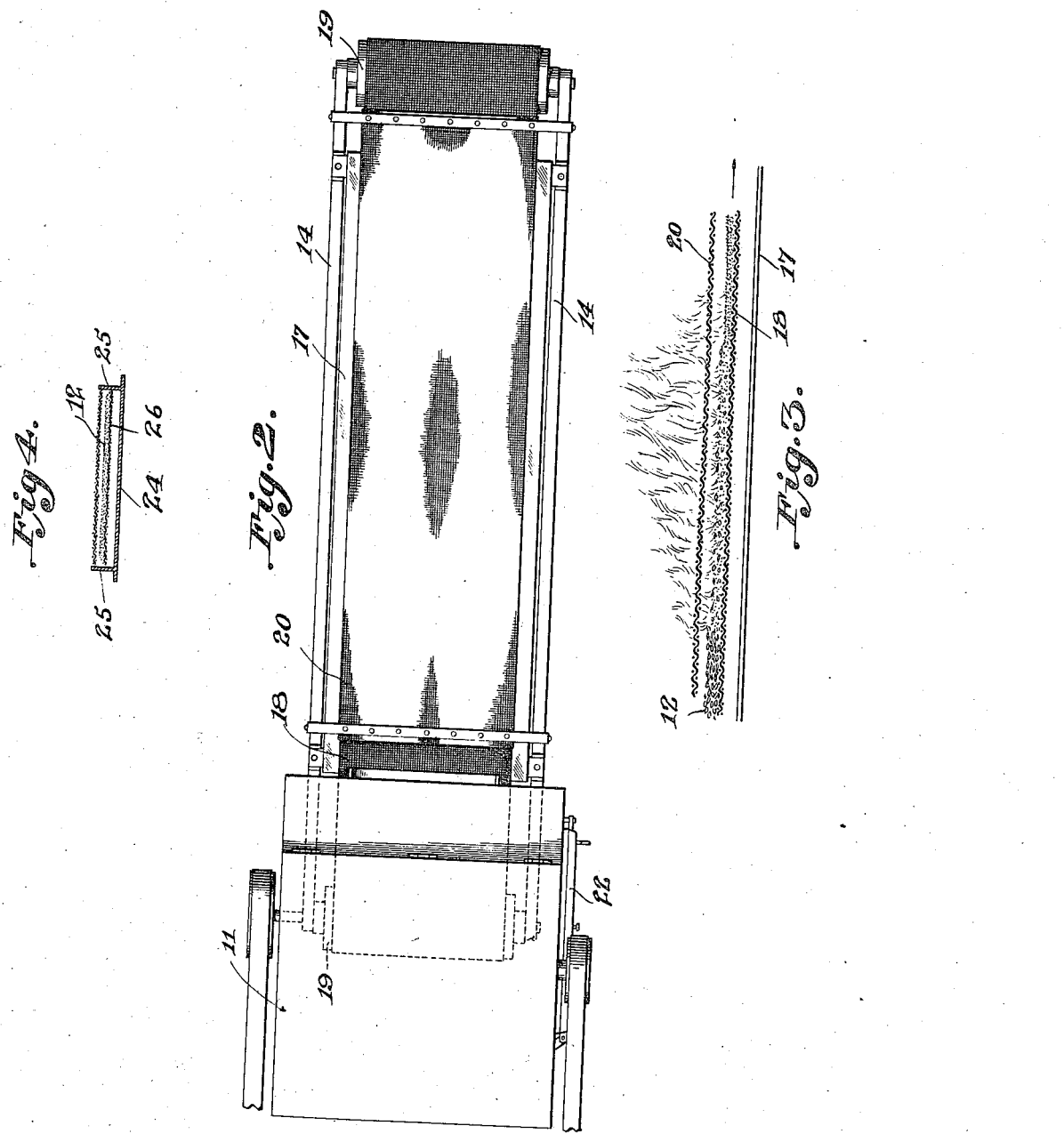
INVENTOR.
James N. Alsop
BY
Cushman, Bryant & Darby
ATTORNEYS Mar. 6, 1923.
J. N. ALSOP
1,447,401
APPARATUS FOR PRODUCING SMOKE
Filed Aug. 11, 1921    3 sheets-sheet 3
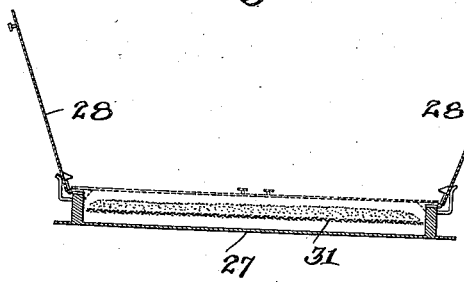
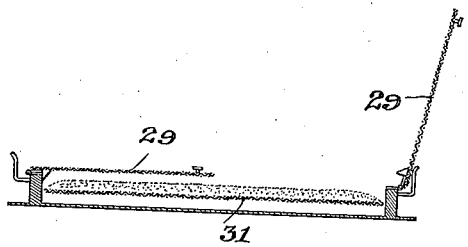
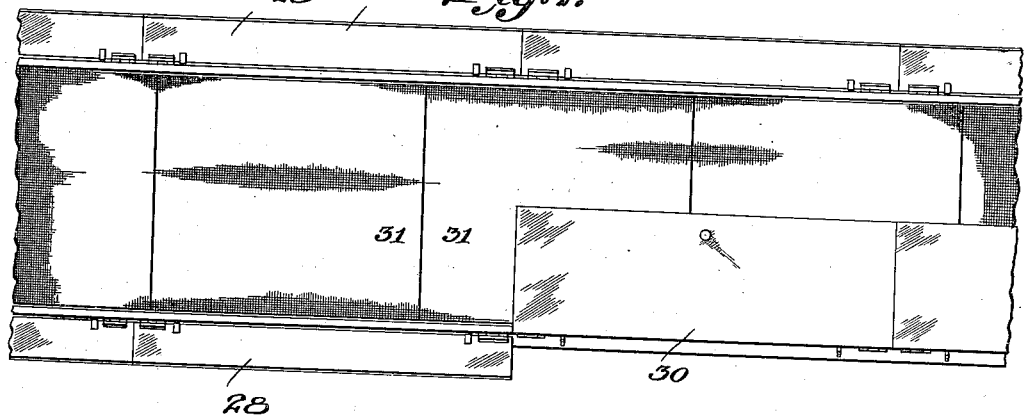
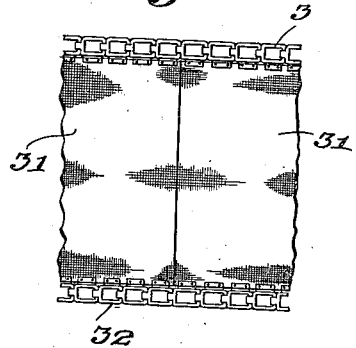
James N. Alsop
INVENTOR.
BY
ATTORNEYS

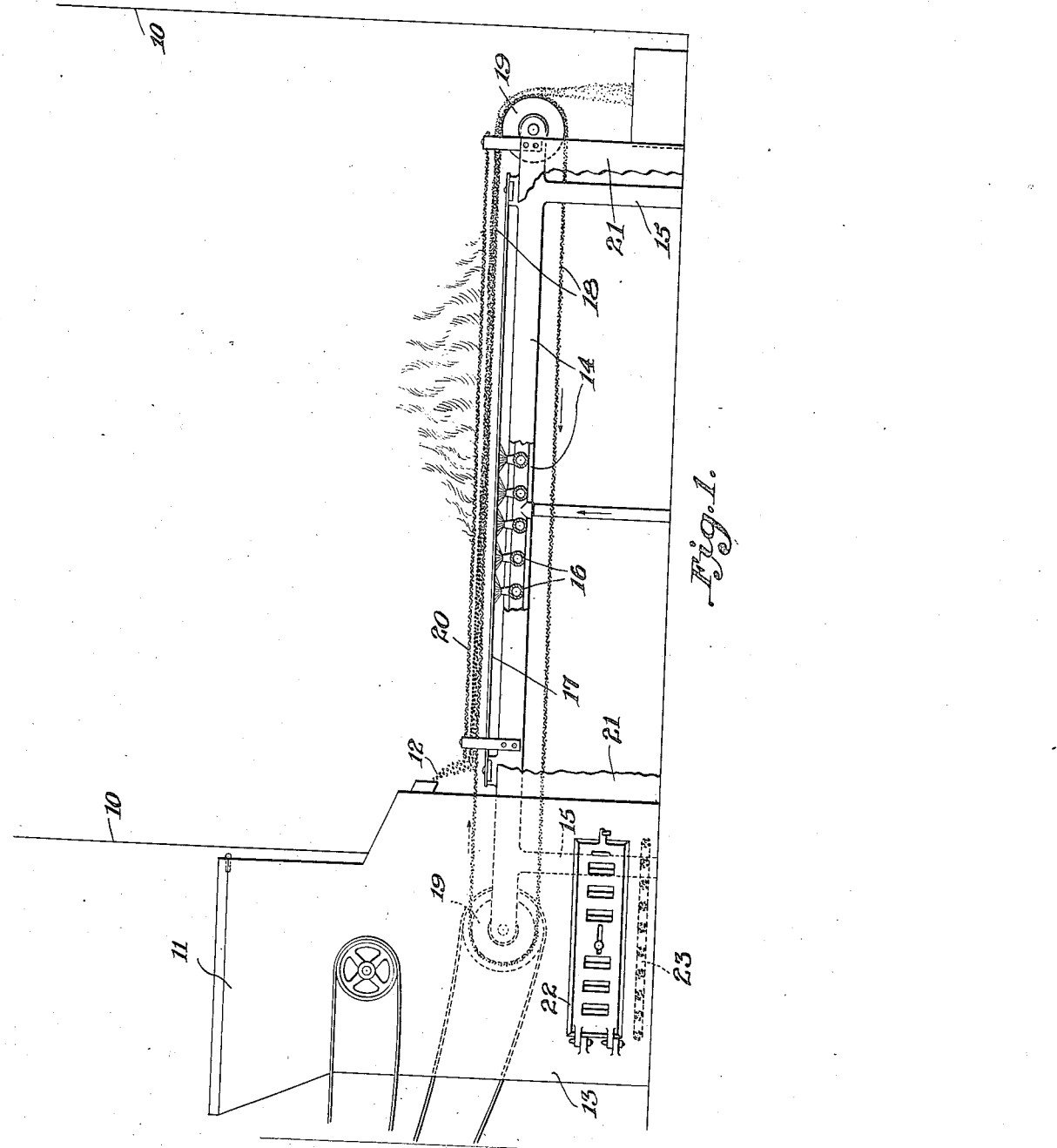

Patented Mar. 6, 1923.

1,447,401

UNITED STATES PATENT OFFICE.

JAMES N. ALSOP, OF OWENSBORO, KENTUCKY, ASSIGNOR TO PACKER'S MEAT SMOKING CORPORATION, OF CHICAGO, ILLINOIS, A CORPORATION OF DELAWARE.

APPARATUS FOR PRODUCING SMOKE.

Application filed August 11, 1921. Serial No. 491,637.

*To all whom it may concern:*

Be it known that I, JAMES N. ALSOP, a citizen of the United States, residing at Owensboro, in the county of Daviess and State of Kentucky, have invented new and useful Improvements in Apparatus for Producing Smoke, of which the following is a specification.

The present invention relates to an improved apparatus for the destructive distillation of wood and kindred substances and the releasing therefrom of the gaseous constituents for use, in accordance with the present disclosure, for the curing of organic substances, such as meats, although it will be understood that the particular adaptation of my apparatus herein disclosed in not intended as defining the limits of its use.

The invention will be shown and described as applied to smoke houses, but it is to be understood that this disclosure is merely illustrative and not restrictive, and that when reference is made, hereinafter, to "smoke" it is intended to comprehend within that term any of the vapors or gaseous constituents which may be thrown off in destructively distilling or oxidizing substances under treatment; and, furthermore, that when references is made to "saw dust" it is not intended as limiting the apparatus and disclosure to the use of saw dust, as any desired material, following my method and using the apparatus herein shown, may be utilized. Furthermore, while more particularly designed, and so described, for the curing of meats, it will be obvious that its use may be extended to operations other than the curing of meats and still be within the range of my invention.

The object of the invention is to provide an apparatus by which saw dust may be destructively distilled and the gaseous constituents driven off and brought to a highly efficient condition for the curing of meats, the apparatus designed to accomplish this being of such a type as that a continuous operation results, and from a practical standpoint the process of meat curing by smoke is much simplified and expedited.

I accomplish these objects by the use of an apparatus which will enable me to continuously feed the saw dust to instrumentalities which will effect its complete oxidation without active combustion to the point of flaming, and as another step, there is contemplated, effecting such oxidation in the presence of pre-heated air in regulated volume, so that the resultant curing agent will consist of the commingled gaseous products from the saw dust and the pre-heated air.

In order that the invention may be clear to those skilled in the art, and one apparatus by which the invention may be performed may be fully disclosed, I have illustrated in the accompanying drawings one physical embodiment of my invention, it being obvious that mechanical expedients other than those herein disclosed may be adopted to effect the same result and still be within the range of my invention:

In said drawings:—

Fig. 1 is a view in side elevation of an apparatus embodying my invention.

Fig. 2 is a view in plan of the apparatus shown in Fig. 1.

Fig. 3 is a detail view to show the relation of the heating plate, traveling screen and smothering screen.

Fig. 4 is a detail cross sectional view showing a slightly different form of heating plate, Fig. 5 is a detail cross sectional view for a slightly different form of apparatus, Fig. 6 is a detail cross sectional view of still another development, Fig. 7 is a plan view showing a slightly different type of bed and traveling screen, and Fig. 8 is a detail view illustrating a modification of the traveling screen shown in the other views.

Referring to the drawings by numbers, like numbers indicating like parts in the several views, 10 indicates, conventionally, the walls of a smoke house which may be of any usual or desired construction, this smoke house being diagrammatically shown, since the details of the smoke house construction are not essential.

Projecting into or wholly located within, if desired, the smoke house 10, is my smoke producing apparatus, which comprises a hopper 11 for the saw dust, which hopper may be of any desired type and dimensions, and is provided with any usual agitator or feeding means for effecting the delivery, in a thin sheet of saw dust, or other material to be converted, 12, from a suitable feed opening in the hopper. The hopper or feeding box 11 is not described in detail as it is of a well known type, such as is very commonly used in grain feeders for flouring mills and the like, said hopper being mounted on a suitable base 13, as shown in Fig. 1. Extending from the feeding side of the hopper 11 is a horizontally disposed supporting frame 14 of any suitable construction, and as here shown, of rectangular form, said frame being supported, as by legs 15, or in any convenient manner.

Mounted upon the frame 14 is a series of heat producing elements 16 which may be of any suitable type and construction. These elements 16 are shown as gas burners, supplied from any suitable source; and controlling and regulating devices of the types commonly in use may be utilized to control and regulate full flow, and, as a resultant, the temperature of the element 16.

Secured to the frame 14 in any suitable manner, and lying above the burners 16 is a metal plate 17. As herein shown this metal plate is a thin plate, and in my experiments I have used a copper plate, which is supported in any suitable manner, as by supports at its ends to which it is secured as shown in Fig. 1.

Closely disposed above the plate 17, is a support for smoke producing material in the form of a moving carrier 18, shown in the present example as a perforated carrier in the form of a screen. The screen 18 may be of endless belt formation, being supported at its opposite ends by the rolls or pulley members 19, means as belt and pulley drive, being provided for imparting movement to the rolls or screen, or both, in order to give a continuous travel of the screen 18 over the plate 17, in the direction of the arrow, Fig. 1, outwardly from the hopper 11. By this construction there is provided a stable support for the smoke producing material so that it will be retained thereon during the smoke producing operation and until the material has been reduced to ash with the volatile constituents completely driven off. Furthermore, the support permits the free and ready escape of the smoke, so that it will ascend into the smoke-house or be conducted to any suitable means for delivering it to the point of use.

In operation, the machine being set in motion, the hopper mechanism will deliver, as is customary in feeders of this kind, a thin regulated sheet of saw dust upon the traveling screen 18, which, with an evenly distributed deposit of saw dust, will move slowly over the metal plate 17. The burners 16 will create a high temperature, and, the heat will be transmitted to the plate 17 over which the loaded screen is traveling. Distillation of the saw dust deposited on the screen will at once begin, and the gaseous content of the saw dust will be thrown off, oxidation progressing from the feeding point of the saw dust upon the screen progressively, through the stages of drying, charring, and reducing to the condition of ash, as the screen moves over the hot plate 17, the ash or inert material being dumped off the forward end of the moving screen 18 into any suitable pit or receptacle.

The temperature will be so regulated as that oxidation and separation of the saw dust into its volatile and inert constituents will take place, preferably without such active combustion as will produce a flaming condition, and in order that active combustion and flaming of the saw dust may be more certainly guarded against, there may be provided, if desired, a fixed screen 20, disposed as shown, just above the traveling screen 18, said screen 20 being suitably supported on the frame 14, or in any other convenient manner. While the use of the fixed screen 20 is not absolutely essential, I have found in my experiments that it serves to break up any violent eddy currents caused by the breaking down of the organic matter and liberation of the gaseous constituents, and which, unless broken up may tend to cause flaming of the saw dust.

The degree of heat necessary to properly char and bring the saw dust to a smoke producing condition will, of course, vary with atmospheric temperatures. It must be so regulated that active combustion and blazing will not occur. I have found in my experiments that a surface heated approximately to 600 degrees F., and having therein saw dust approximately one-eighth of an inch deep will give, under an atmospheric temperature of approximately 85 degrees, good smoking results, but this, of course, will vary with conditions.

Preferably, the traveling screen support will, as shown in Fig. 1, be boxed in at its sides and ends by suitable side walls, as 21 (see Fig. 1) so as to form a closed chamber in which the air passing into the apparatus, as hereinafter described, will be pre-heated, and rising beneath the plate 17 brought to a high temperature and escaping at the edges of the plate, rise in heated condition and commingle with the products of combustion from the saw dust on the traveling screen.

Provision may, if desired, be made for controlling the ingress of air to the apparatus, and while this may be accomplished in various ways, I have shown as one convenient way the provision of an inlet or damper 22 in the base 13 of the apparatus, which inlet may be suitably controlled so as to permit a large or small volume of air to enter the base and pass to the pre-heating chamber.

If it is desired, to initially heat the air, under certain conditions of low temperatures, at the point 22 of its entrance into the apparatus, this may be accomplished by a heater 23 which may be of the steam coil type or other suitable type, or, in fact, any means for increasing temperature, so that the air coming through the inlet may be initially heated and then go forward to the oxidizing instrumentalities at a relatively high temperature.

In Fig. 4 I have shown a plate 24 as provided with upwardly projecting side members 25 of sufficient height to expand the screen and prevent the saw dust from escaping from the side edges thereof, and these side members also prevent any side draughts or currents against the burning saw dust.

In Fig. 5 I have shown the plate 27 as provided with cover plates 28 which may be left open, as shown in full lines in Fig. 5, or closed, as shown in dotted lines, these plates 28 being so arranged that the area scheme of the traveling screen may be limited as to width by closing one or the other side plates so as to afford a greater or less smoking area.

In the form shown in Fig. 6 the plates 29 are shown as of screen formation, and would serve the same purpose as the smothering screen disclosed in the earlier views.

If desired, and, in fact, this will be found to be preferable, the plates shown in Figs. 5 and 6 will be made in sections, as shown in Fig. 7, in order that the smoke producing area may not be only limited as to width, but also as to length by closing the sectional covering plates 30 over the screen, as indicated in Fig. 7.

In the form of the invention shown in Figs. 1 and 2 the traveling screen, which carries the saw dust, is shown and described as of continuous length, but I have found that good results and prevention of buckling or warping of the screen under the heat is secured by means of the screen construction illustrated in Figs. 7 and 8, in which the screen, instead of being in one continuous piece, will be made up in sections 31 arranged end to end so as to give a continuous surface, and secured in any suitable manner at their edges to carry chains 32 of any usual construction, which carrying chains may, if desired, run over sprocket wheels so as to give positive drive to the chain.

By use of the apparatus described, it is possible to produce in a uniform manner a continuous supply of smoke, and, furthermore, to utilize comminuted material, such as saw dust, which may be conveniently handled and fed. The machine, once installed, is semi-automatic, in that, so long as the hopper is provided with the smoke producing material the smoking of the same will proceed, and its production may be regulated and controlled to meet the conditions obtaining in the smoke house with but little attention on the part of the operator.

I claim:

1. In smoke producing apparatus, the combination of means to form a stable support for smoke producing material and permit the free and ready escape of smoke therefrom, a source of heat in such relation to said support and the material thereon as to bring said material to a smoke producing condition, and heat conducting means interposed between said source of heat and said support.

2. In smoke producing apparatus, the combination of a foraminous support for the smoke producing material, a source of heat, and heat conducting means interposed between said source of heat and said foraminous support.

3. In smoke producing apparatus, the combination of travelling means to form a stable support for smoke producing material and permit the free and ready escape of smoke therefrom, a source of heat in such relation to said support and the material thereon as to bring said material to a smoke producing condition, and heat conducting means interposed between said source of heat and said support.

4. In smoke producing apparatus, the combination of a travelling foraminous support for the smoke producing material, a source of heat, and heat conducting means interposed between said source of heat and said travelling foraminous support.

5. In smoke producing apparatus, the combination of a travelling support for the smoke producing material, means for feeding material to said travelling support at a point in its path of travel, a source of heat, and heat conducting means interposed between said source of heat and said travelling support.

6. In smoke producing apparatus, the combination of a source of supply of smoke producing material, a travelling foraminous support in operative relation to said source of supply, means for feeding material to said support, a source of heat adjacent said support, and a heat conducting plate interposed between said source of heat and said support.

7. In smoke producing apparatus, the combination of a source of supply of smoke producing material, a travelling support adjacent said source of supply, means for feeding material to said support, a source of heat, a heat conducting plate interposed between said source of heat and said support, and means for supplying heated air to the material on said travelling support.

8. In smoke producing apparatus, the combination of means to form a stable support for smoke producing material and permit the free and ready escape of smoke therefrom, a source of heat in such relation to said support and the material thereon as to bring said material to smoke producing condition, and means for supplying heated air to the smoke producing material on said support.

9. In a smoke producing apparatus, the combination of means to form a stable support for smoke producing material and permit the free and ready escape of smoke therefrom, a source of heat in such relation to said support as to bring the material to a smoke producing condition, a heat conducting plate interposed between said source of heat and said support, and means for supplying heated air to the smoke producing material on said support.

10. In smoke producing apparatus, the combination of a feeding hopper, a travelling support for smoke producing material adjacent said hopper, a source of heat beneath said travelling support, and a fixed heat conducting baffle plate interposed between said source of heat and said travelling support.

11. In smoke producing apparatus, the combination of a feeding hopper, a travelling support for smoke producing material adjacent said hopper, a source of heat beneath said travelling support, and a fixed heat conducting baffle plate having support embracing members interposed between said source of heat and said travelling support.

12. In smoke producing apparatus, the combination of a feeding hopper, a travelling foraminous support for the smoke producing material adjacent said hopper, a source of heat beneath said support, a fixed heat conducting baffle plate interposed between said source of heat and said travelling support, and means for delivering preheated air beneath said baffle plate.

13. In smoke producing apparatus, the combination of a casing, heat producing devices in said casing, a travelling support for the smoke producing material above said heat producing devices, a heat conducting baffle plate between said heat producing device and said travelling support, and means to regulate the admission of air to said casing.

14. In smoke producing apparatus, the combination of a casing, heat producing apparatus in said casing, a travelling support for the smoke producing material above said heat producing devices, a heat conducting baffle plate between said heat producing device and said travelling support, means to regulate the admission of air to said casing, and means for preliminarily heating the air admitted to said casing.

15. In smoke producing apparatus, the combination of a feeding hopper for the smoke producing material, an open topped casing extending from said hopper, heat producing devices in said casing, a travelling support extending from said hopper over said heat producing devices, a heat conducting baffle plate interposed between said heat producing devices and said travelling support, an air admission opening in a wall of said casing, means for controlling admission of air through said opening, and means within said casing to preliminarily heat the air admitted through said opening.

16. In smoke producing apparatus, the combination of a hopper for the smoke producing material, an open topped casing extending from said hopper, heat producing devices in said casing, a travelling support extending from said hopper over said heat producing devices, a heat conducting baffle plate interposed between said heat producing devices and said travelling support, an air controlling damper in a wall of said casing below said hopper, and heating means adjacent said air damper and below said hopper to preliminarily dry the smoke producing material in the hopper and heat the air admitted to said casing.

In testimony whereof I have hereunto set my hand.

JAMES N. ALSOP.